(12) United States Patent
Bourgeois

(10) Patent No.: US 8,826,807 B1
(45) Date of Patent: Sep. 9, 2014

(54) OUTDOOR SEAFOOD BOILING APPARATUS

(76) Inventor: Norman Bourgeois, Jefferson, LA (US)

( * ) Notice: Subject to any disclaimer, the term of this patent is extended or adjusted under 35 U.S.C. 154(b) by 410 days.

(21) Appl. No.: 13/208,551

(22) Filed: Aug. 12, 2011

Related U.S. Application Data

(60) Provisional application No. 61/373,069, filed on Aug. 12, 2010, provisional application No. 61/405,983, filed on Oct. 22, 2010.

(51) Int. Cl.
A47J 37/12 (2006.01)

(52) U.S. Cl.
USPC .................. 99/407; 99/409; 99/403; 99/413; 99/450

(58) Field of Classification Search
CPC . A47J 37/1219; A47J 37/128; A47J 37/1295; A47J 37/047; A47J 36/20; A21B 5/08
USPC .......... 99/407, 409, 403, 413, 415, 418, 450, 99/412
See application file for complete search history.

(56) References Cited

U.S. PATENT DOCUMENTS

| | | | |
|---|---|---|---|
| 2,550,758 A | 5/1951 | Bemis | |
| 2,707,428 A | 5/1955 | Netreba | |
| 3,685,432 A * | 8/1972 | Hoeberigs | 99/357 |
| 3,714,889 A | 2/1973 | Mazzola et al. | |
| 3,908,531 A * | 9/1975 | Morley | 99/336 |
| 3,971,307 A | 7/1976 | Graham | |
| 3,975,070 A | 8/1976 | Barteau et al. | |
| 4,250,803 A | 2/1981 | Wohlfart | |
| 4,420,006 A | 12/1983 | Moore et al. | |
| 4,450,757 A * | 5/1984 | Alfio | 99/327 |
| 4,580,024 A | 4/1986 | Thomas | |
| 4,623,544 A | 11/1986 | Highnote | |
| 4,724,825 A * | 2/1988 | Fritsch et al. | 126/376.1 |
| 5,209,218 A | 5/1993 | Daneshvar et al. | |
| 5,398,668 A | 3/1995 | Daneshvar et al. | |
| 5,577,438 A | 11/1996 | Amitrano et al. | |
| 5,642,660 A | 7/1997 | Killgore | |
| 5,918,535 A | 7/1999 | Moreau | |
| 2006/0260602 A1 | 11/2006 | Styron, Sr. et al. | |

* cited by examiner

Primary Examiner — Reginald L Alexander
(74) Attorney, Agent, or Firm — Garvey, Smith, Nehrbass & North, L.L.C.; Charles C. Garvey, Jr.; Brent A. North

(57) ABSTRACT

An outdoor food frying apparatus includes a frame having a pot support, a burner element supported upon the frame, and a pot that removably fits the frame. The pot has end walls, a rear wall, a front edge portion, and a bottom wall that gradually increases in curvature from said rear wall to said front edge portion. A basket is pivotally attached to the pot rear wall with one or more hinges. The basket is correspondingly sized and shaped to fit the pot interior. The basket is movable about the hinge between cooking and food discharge positions. The lid is pivotally attached to the pot. The lid is movable between a cooking position wherein the lid covers the pot upper opening and food discharge position wherein the lid rotates at least 180 degrees from said cooking position, forming a tray for receiving food discharged from the basket.

21 Claims, 9 Drawing Sheets

OUTDOOR SEAFOOD BOILING APPARATUS

CROSS-REFERENCE TO RELATED APPLICATIONS

This is a non provisional patent application of U.S. Provisional Patent Application Ser. No. 61/373,069, filed 12 Aug. 2010, and U.S. Provisional Patent Application Ser. No. 61/405,983, filed 22 Oct. 2010.

Priority of U.S. Provisional Patent Application Ser. No. 61/373,069, filed 12 Aug. 2010, and U.S. Provisional Patent Application Ser. No. 61/405,983, filed 22 Oct. 2010, each of which are hereby incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to gaseous fueled fired outdoor frying devices such as deep fat fryers. More particularly, the present invention relates to an improved outdoor frying apparatus having a specially configured pot and a basket with shallow and deep sections that fits the pot interior, the basket being pivotally connected to the pot at a hinge and along a first edge of the pot, the basket having a ramp section opposite the hinge for camming or biasing or pushing cooked food items to gravitate toward the deep section of the basket as the basket is rotated from a cooking position to a dumping position. The pot has a configuration that corresponds to and conforms generally to the basket.

2. General Background of the Invention

Many food frying devices have been patented. Examples can be found in the following table.

The following U.S. Patents are incorporated herein by reference:

| Pat. No./Pat. PUBL. | TITLE | ISSUE DATE/PUBL. DATE MM-DD-YYYY |
|---|---|---|
| 2,550,758 | French Fryer | May 1, 1951 |
| 2,707,428 | Food Boiling Apparatus | May 3, 1955 |
| 3,714,889 | Outdoor Deep Fryer | Feb. 6, 1973 |
| 3,971,307 | Deep Fat Fryer | Jul. 27, 1976 |
| 3,975,070 | Flour and Batter Apparatus | Aug. 17, 1976 |
| 4,250,803 | Deep Fryer | Feb. 17, 1981 |
| 4,420,006 | Spray Cleaning System for Frying Apparatus | Dec. 13, 1983 |
| 4,580,024 | Microwave Deep Fat Fryer | Apr. 1, 1986 |
| 4,623,544 | Constant Temperature Fryer/Cooker Assembly | Nov. 18, 1986 |
| 5,209,218 | Deep Frying Apparatus | May 11, 1993 |
| 5,398,668 | Deep Frying Apparatus | Mar. 21, 1995 |
| 5,577,438 | Gas Fired Deep Fat Fryer | Nov. 26, 1996 |
| 5,642,660 | Gas Fired Deep Fat Fryer | Jul. 1, 1997 |
| 5,918,535 | Apparatus for Suspending an Inner Basket Within an Outer Pot of a Cooking Vessel, and Method for Using Same | Jul. 6, 1999 |
| 2006/0260602 | Cooking Apparatus | Nov. 23, 2006 |

BRIEF SUMMARY OF THE INVENTION

The present invention provides a food frying apparatus for use in an outdoor setting. The apparatus includes a frame fitted with one or more burner elements supported upon the frame, the burner element(s) being positioned below a pot that is supported by the frame. The pot is eccentrically shaped to concentrate more of the pot total volume near a provided pivotal connection, hinged connection, or hinge that joins a basket to the pot. The pot rests upon the base, the pot having a bottom wall, side walls and an open top.

An eccentrically shaped basket that is sized and shaped to conform to the shape of the pot and occupy the pot interior, the basket pivotally connecting to the pot along a pot edge and with the hinge or hinged connection.

A pot lid removably fits and covers the open top. The lid can be pivotally or hingedly connected to the frame.

The pot depth gradually decreases from a maximum depth to a minimum depth at a position spaced farthest away from the hinge.

In one embodiment, at least one side wall has a partial elliptical shape. In one embodiment, at least two of the side walls have a partial elliptical shape.

The present invention includes a seafood boiler apparatus, comprising a base, a pot that rests upon the base, the pot having a bottom wall, side walls, an open top, a pot shallow end portion and a pot deep end portion, a basket that is sized and shaped to occupy the pot interior, the basket pivotally connecting to the pot at a hinge, a pot lid that removably fits and covers the open top, and the pot depth gradually decreasing from a maximum depth vertically below the pivot to a minimum depth at a position spaced farthest away from the hinge.

Optionally, at least one side wall has a partial elliptical shape.

Optionally, at least two of the side walls has a partial elliptical shape.

Preferably, the pot bottom wall is curved.

Preferably, the lid is hingedly attached to the pot.

Preferably, the lid is rotatably attached to the pot.

Preferably, the pot has a hinge mounted above the pot deep end portion, the lid being rotatably attached to the pot at the hinge.

Preferably, the lid is rotatably attached to the pot and the apparatus further comprises multiple stops that enable the lid to be opened to different positions, said lid positions forming different angles with the top of the pot.

Optionally, one of said angles is an obtuse angle.

Optionally, one of said angles is an angle of about 180 degrees.

The present invention includes a seafood boiler apparatus comprising a frame having a pot support, a burner element supported upon the frame, a pot that removably fits the frame, the pot having end walls, a rear wall, a front edge portion, and an inclined bottom wall that gradually changes the water depth in said pot from a deep pot depth next to said rear wall to a shallow pot depth next to said front edge portion, said bottom connecting between said rear wall and said front edge portion, said bottom wall connected to each of said end walls, a basket that is pivotally attached to the pot rear wall, the basket being correspondingly sized and shaped to said pot so that it fits within the pot interior, the basket being movable about the hinge between cooking and food discharge positions, and a lid that is movably attached to the pot, said lid being movable between a cooking position wherein the lid covers the pot upper opening and food discharge position wherein the lid rotates through at least an obtuse angle from said cooking position, wherein said lid forms a tray for receiving food discharged from the basket when the basket rotates to the discharge position.

Preferably, the bottom wall is curved.

Preferably, each of the two end walls has a partial elliptical shape.

Preferably, the pot bottom wall is elliptically curved.

Optionally, the lid is pivotally attached to the pot.

Optionally, the lid is rotatably attached to the pot.

Preferably, the pot has a pot deep end portion, and the apparatus further comprises a hinge mounted above the pot deep end portion, the lid being rotatably attached to the pot at the hinge.

Preferably, the lid is rotatably attached to the pot and the apparatus further comprises multiple stops that enable the lid to be opened to different positions, said lid positions forming different angles with the top of the pot.

Optionally, one of said angles is an obtuse angle.

Optionally, one of said angles is an angle of about 180 degrees.

Preferably, said basket has a planar rear wall that forms a connection with said basket hinge.

Preferably, the basket pivotally connects to the pot with a pinned hinged connection that is removable so that the basket can be separated from the pot by removing the pinned hinged connections.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
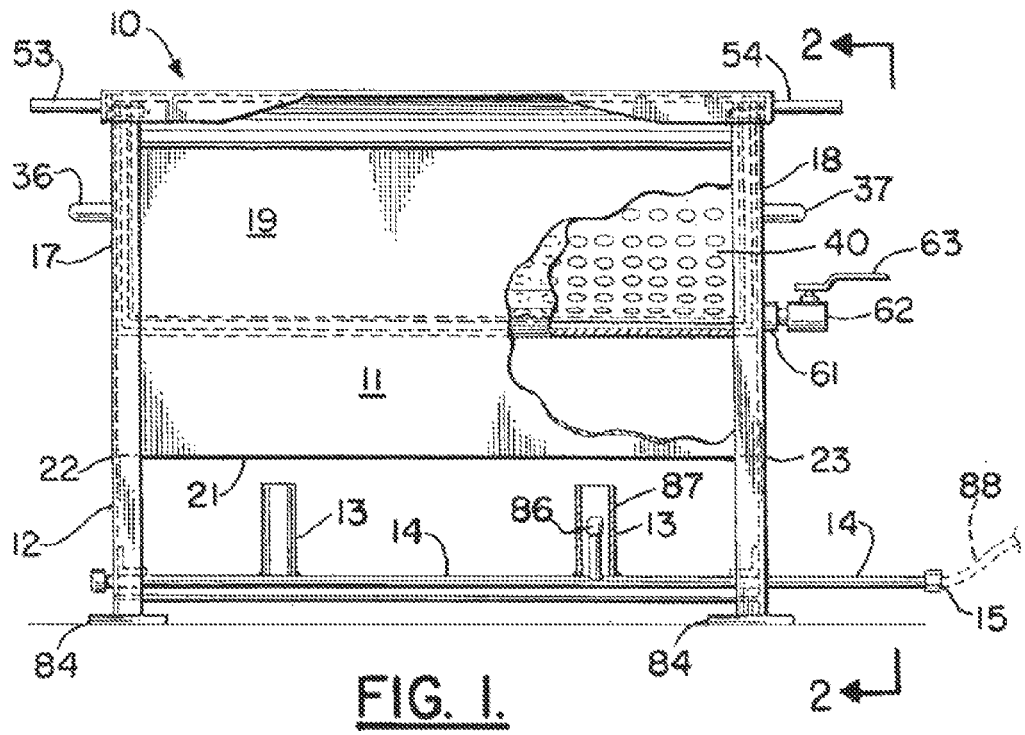
FIG. 1 is a front perspective view of a preferred embodiment of the apparatus of the present invention.
Figure 2:
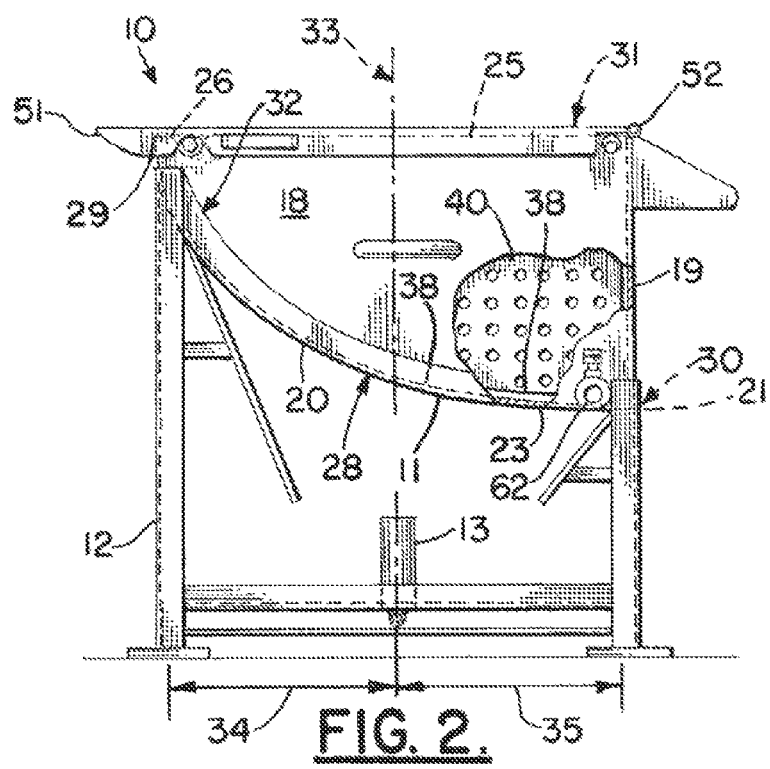
FIG. 2 is a side view of a preferred embodiment of the apparatus of the present invention.
Figure 3:
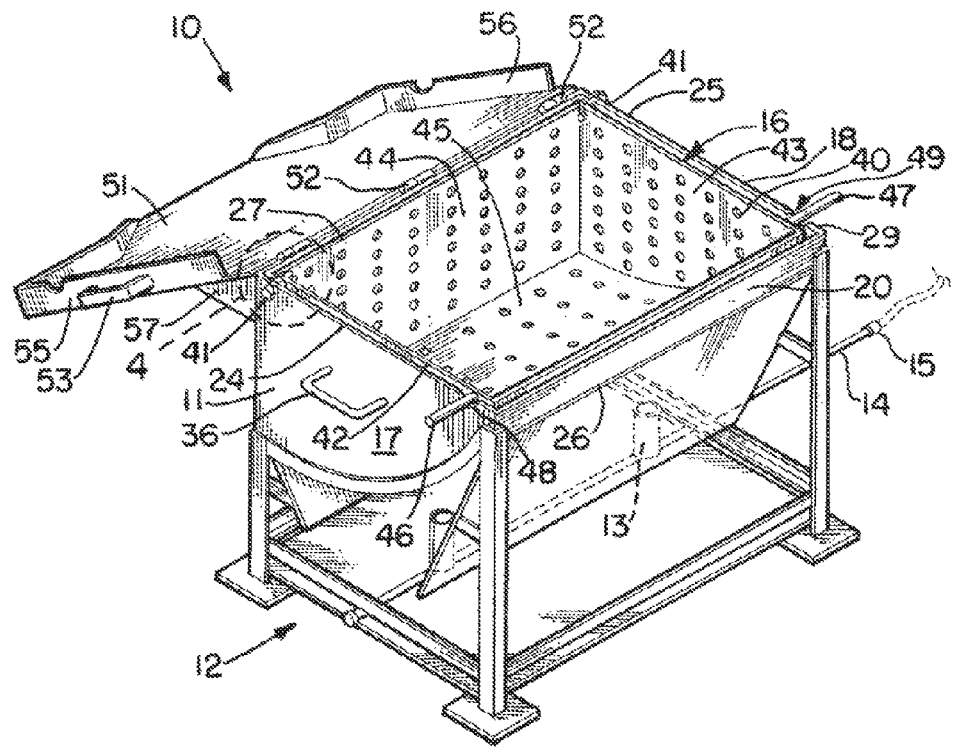
FIG. 3 is a perspective view of a preferred embodiment of the apparatus of the present invention.
Figure 4:
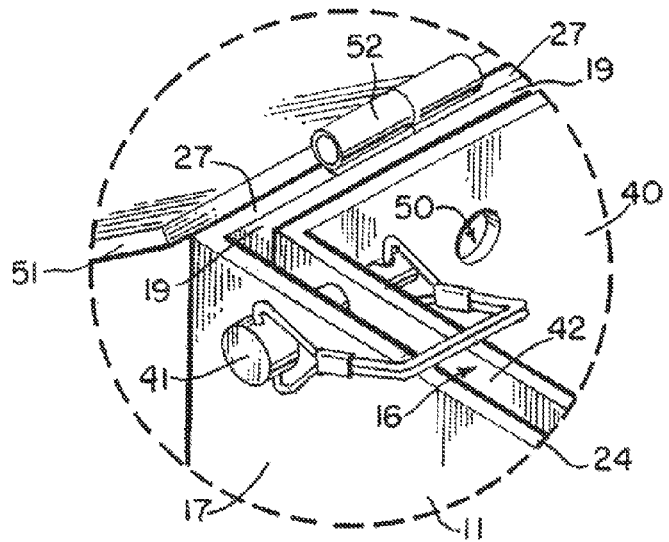
FIG. 4 is a fragmentary perspective view of a preferred embodiment of the apparatus of the present invention.
Figure 5:
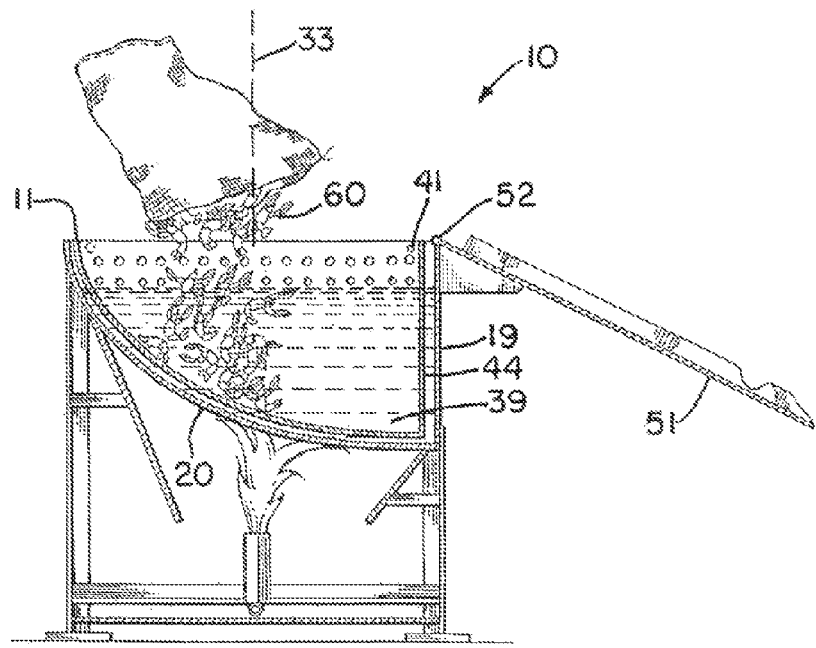
FIG. 5 is a side sectional view of a preferred embodiment of the apparatus of the present invention.

FIGS. 1-8 show a preferred embodiment of the apparatus of the present invention designated generally by the numeral 10. Apparatus 10 is preferably of welded steel or welded aluminum construction. As shown in FIGS. 1 and 3, outdoor frying apparatus 10 provides a base or frame 12. The frame or base 12 can be somewhat elevated, supported on a plurality of legs or feet 84. Burner element or elements 13 are supported on frame or base 12 for generating a flame or flames 85 for transferring heat to a cooking vessel or pot 11. A fuel supply line 14 can be in the form of a pipe that supplies fuel to each burner element 13. The burner elements 13 are conventional in that they can comprise a burner jet 86 inside of a vertically positioned open ended pipe or tube 87. Such burner elements 13 are commercially available. Fuel supply line 14 is provided with an influent fitting 15 for enabling a connection to be made to a fuel supply hose 88 that is connected to a source of fuel such as a pressurized canister of propane or butane or a source of natural gas.

Pot 11 has a pot interior 16 that is receptive of basket 40. Pot 11 has a pair of opposed end walls 17, 18, a rear wall 19, and a bottom wall 20. A seam or joint (for example, welded connection) 21 joins pot rear wall 19 to pot bottom wall 20. A seam or joint 21 joins end wall 17 to bottom wall 20. A curved seam or curved joint 23 (e.g. welded) joins end wall 17 to pot bottom wall 20. Similarly, a curved seam or curved joint 22 joins end wall 17 to pot bottom wall 20 (see FIGS. 1-3).

Each end wall 17, 18 has an upper edge 24, 25. End wall 17 has upper edge 24. End wall 18 has upper edge 25. Rear wall 19 has upper edge 27. An upper edge 26 is provided as an end of bottom wall 20. The upper edge 26 is generally opposite and can be parallel to upper edge 27 (see FIG. 3).

Each of the curved joints or seams 22, 23 provides a curvature 28 that gradually increases in curvature between upper edge 26 and seam 21 (see FIGS. 1-2). As an example, each of the end walls 17, 18 can be in the shape of a part (e.g., one fourth) of an ellipse. In the drawings, a reference point 29 is the intersection of between upper edge 26 and upper edge 25 (see FIGS. 2-3). Another reference point 30 is the intersection of rear wall 19 and bottom wall 20 (see FIG. 2). The curvature between reference points 29 and 30 gradually increases beginning at reference point 29 with a smaller radius of curvature for the curvature 28 or curved seam or joint 22, 23 and ending with a greater radius of curvature at reference point 30.

The plurality of upper edges 24, 25, 26, 27 define a horizontal plane 31 (see FIG. 2-3). Notice that the bottom wall 20 provides a first ramp section 32 that extends to this horizontal plane 31, meeting upper edge 26 (see FIG. 2). This arrangement concentrates items to be cooked closer to the intersection (see reference point 30) of bottom wall 20 and rear wall 19. In the drawings, a vertical reference line 33 is positioned exactly halfway between the upper edge 26 and rear wall 19. Thus, the dimensions 34 and 35 are equal. However, a greater volume of liquids is contained in that part of the pot 11 interior 16 in between vertical reference line 33 and rear wall 19 when compared to the volume of liquid contained in pot 11 interior 16 in between vertical reference line 33 and upper edge 26.

Pot 11 can be provided with a pair of handles 36, 37 for enabling one or more users to lift the pot 11 from base 12 for purposes of cleaning, for example (see FIG. 1).

The pot bottom wall 20 includes inclined first ramp section 32 and a lesser inclined second ramp section 38 (see FIG. 2).

Basket 40 has a size and shape that corresponds to pot 11. In this fashion, basket 40 fits into pot 11 interior 16 during cooking. Basket 40 pivotally attaches to pot 11 at one or more hinges or pivotal connections 41. Basket 40 has end walls 42, 43, rear wall 44 and bottom wall 45. A pair of handles 46, 47 can be provided for lifting basket 40 when emptying its contents. When the handles 46, 47 are lifted upwardly, basket 40 rotates upon its hinges or pivotal connections 41 with pot 11. Recesses at 48, 49 can be provided on pot 11 for receiving handles 46, 47.

Basket 40 can be of a plurality of sheets of welded aluminum material or the like, perforated with perforations or openings 50. As with the pot 11, basket 40 provides a first inclined ramp section 64 and a lesser inclined second ramp section 82 (see FIG. 8).

Figure 6:
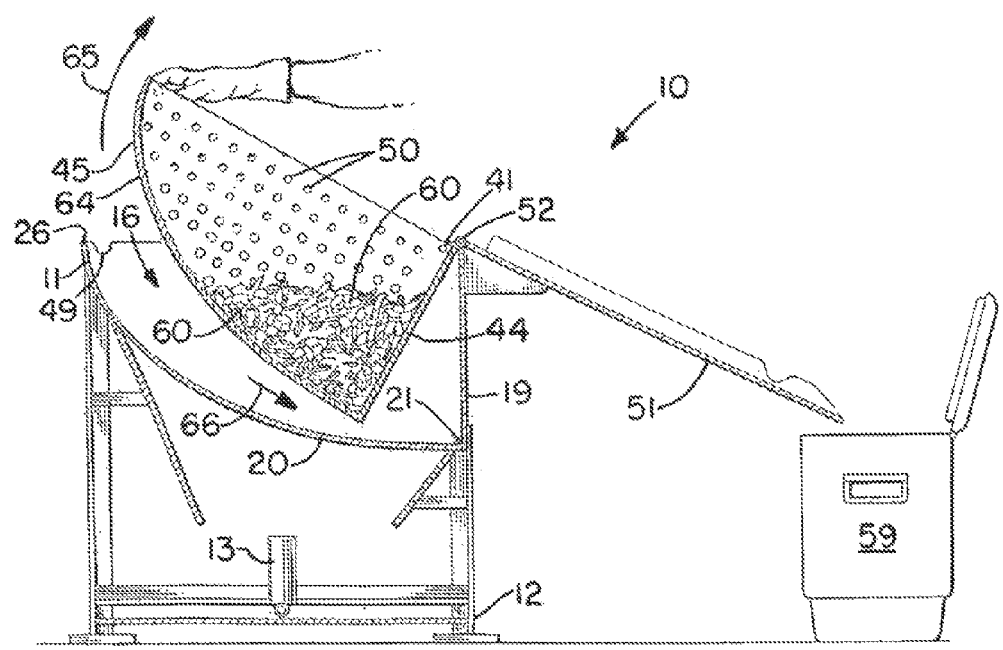
FIG. 6 is a side sectional view of a preferred embodiment of the apparatus of the present invention.
Figure 7:
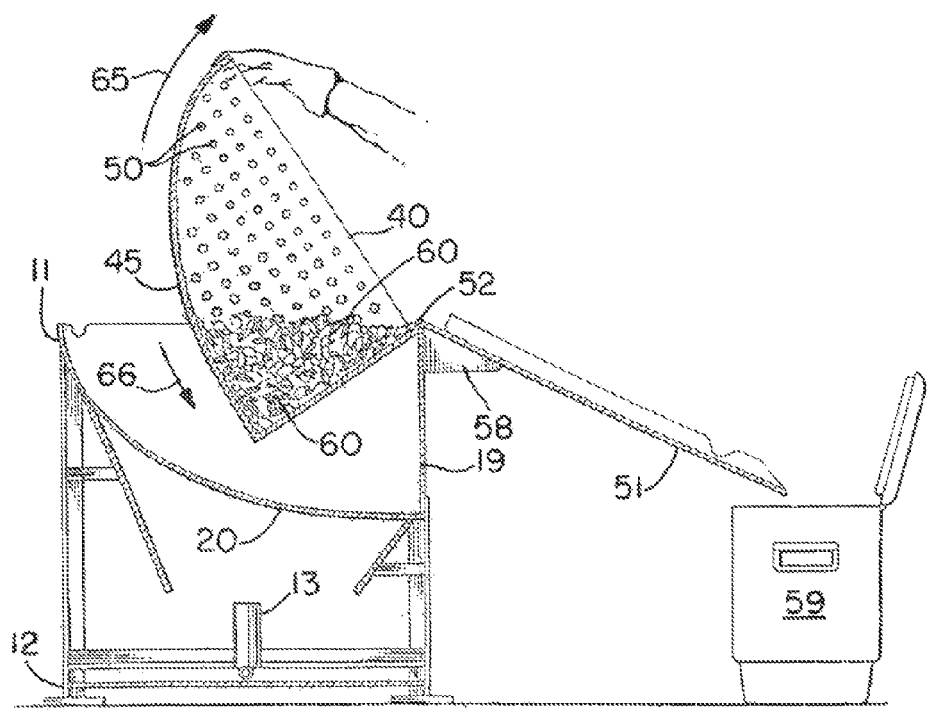
FIG. 7 is a side sectional view of a preferred embodiment of the apparatus of the present invention.
Figure 8:
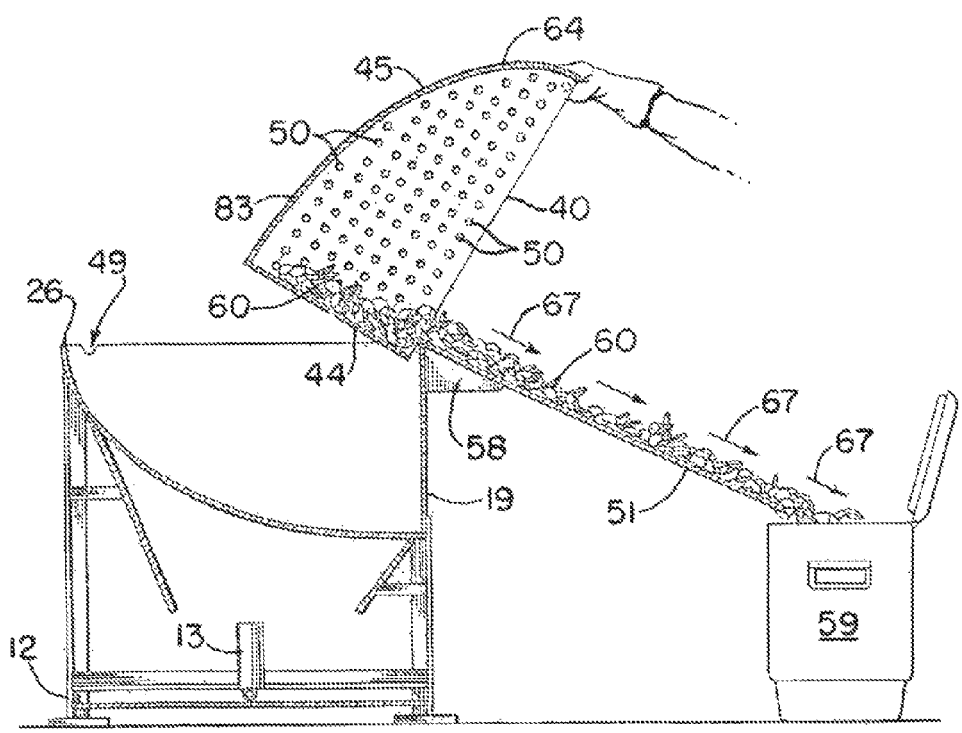
FIG. 8 is a side sectional view of a preferred embodiment of the apparatus of the present invention.
Figure 9:
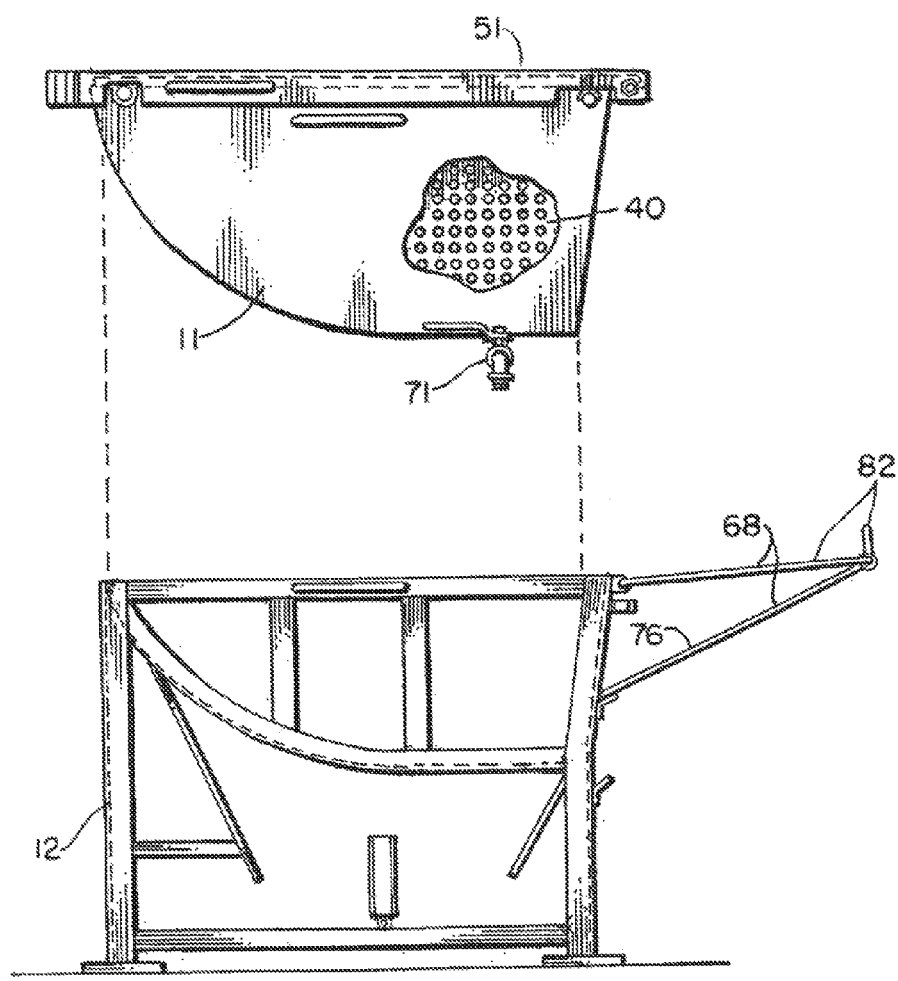
FIG. 9 is an elevation view of the alternate embodiment of the apparatus of the present invention.
Figure 10:
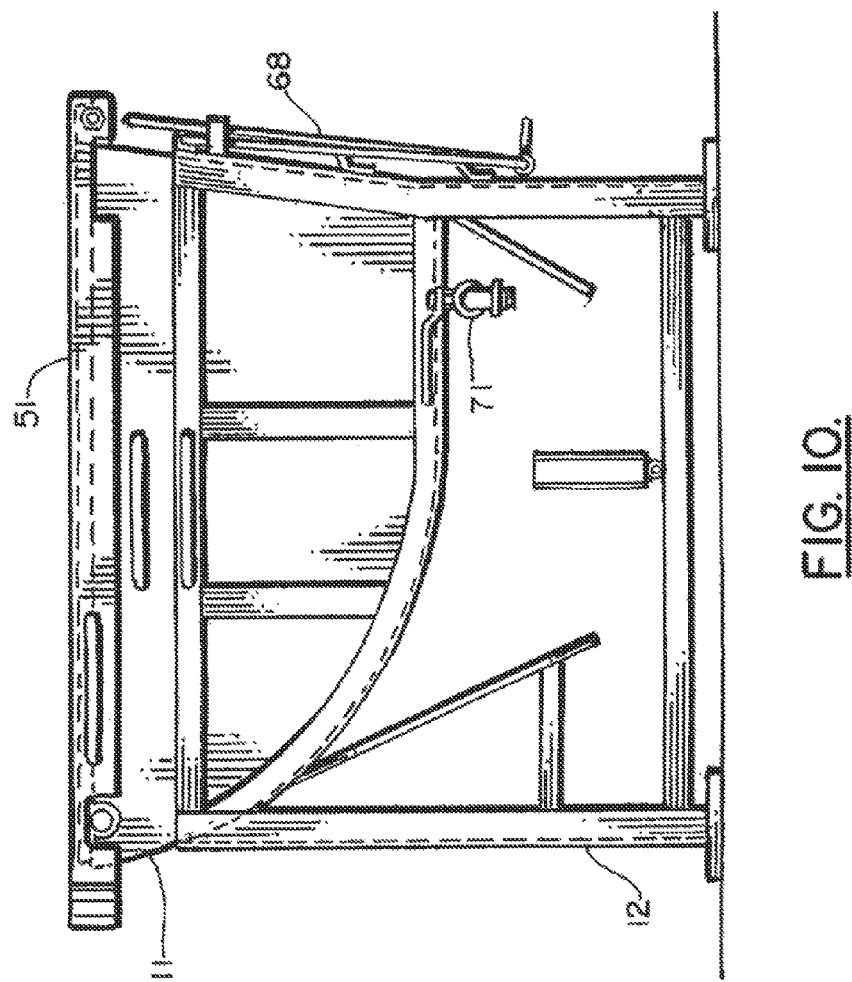
FIG. 10 is an elevation view of the alternate embodiment of the apparatus of the present invention.
Figure 11:
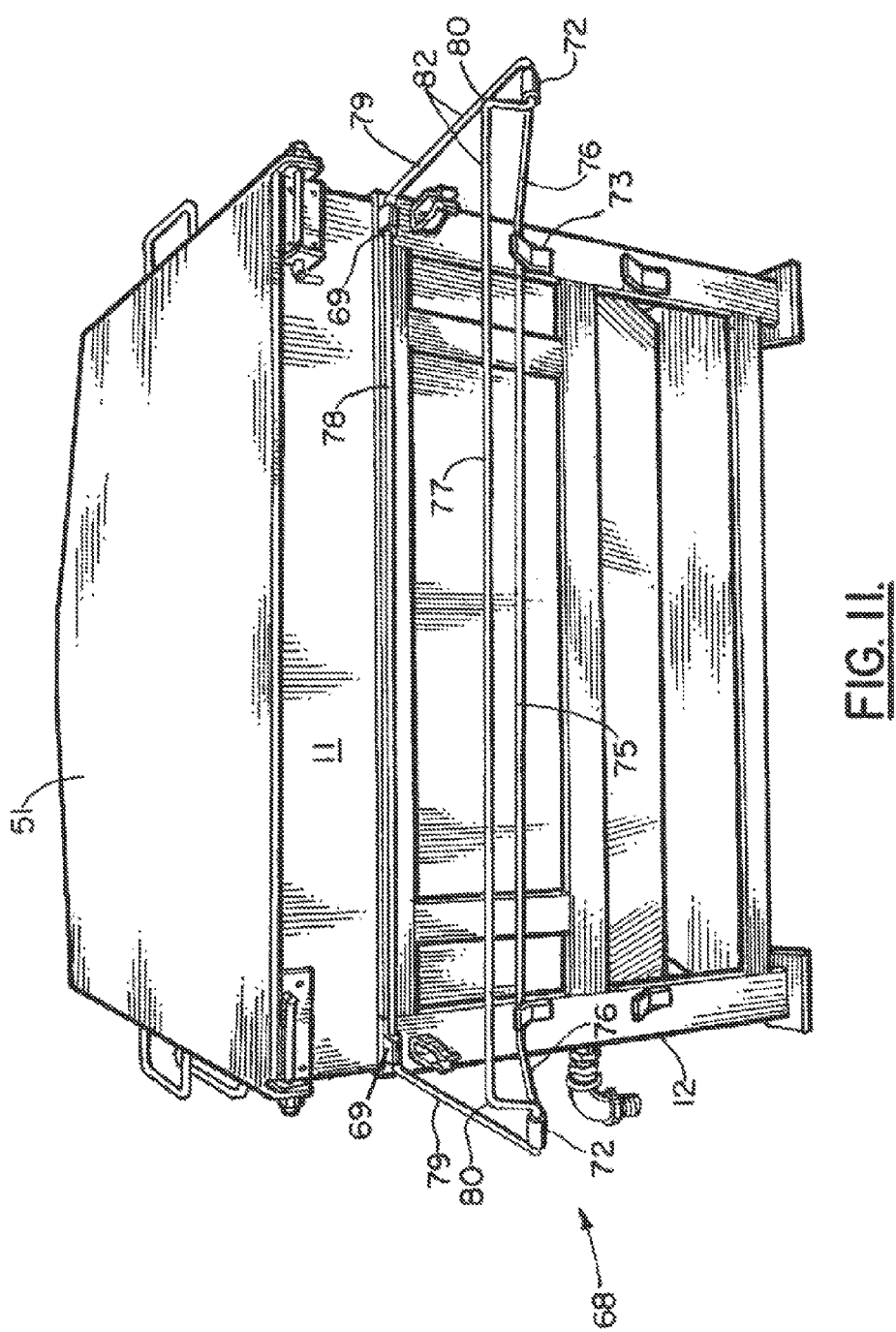
FIG. 11 is a perspective view of the alternate embodiment of the apparatus of the present invention.
Figure 12:
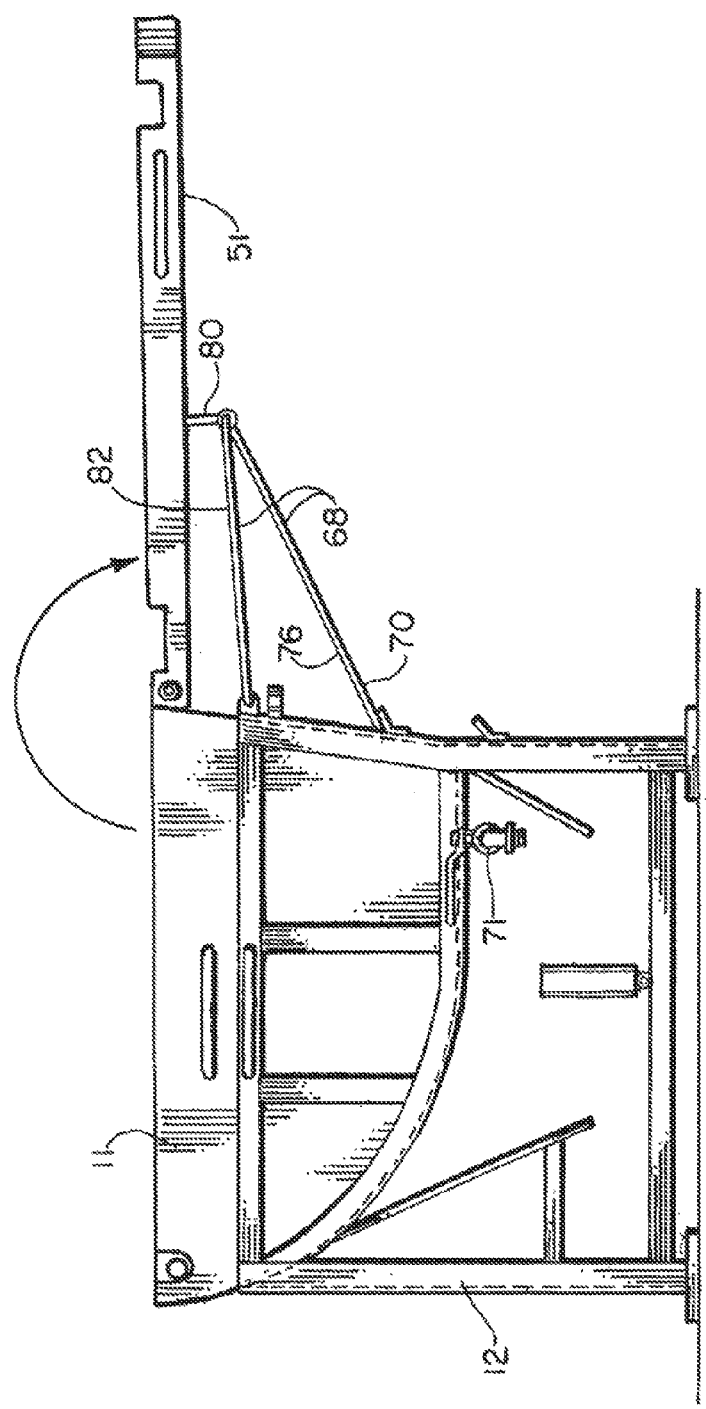
FIG. 12 is a side view of the alternate embodiment of the apparatus of the present invention.
Figure 13:
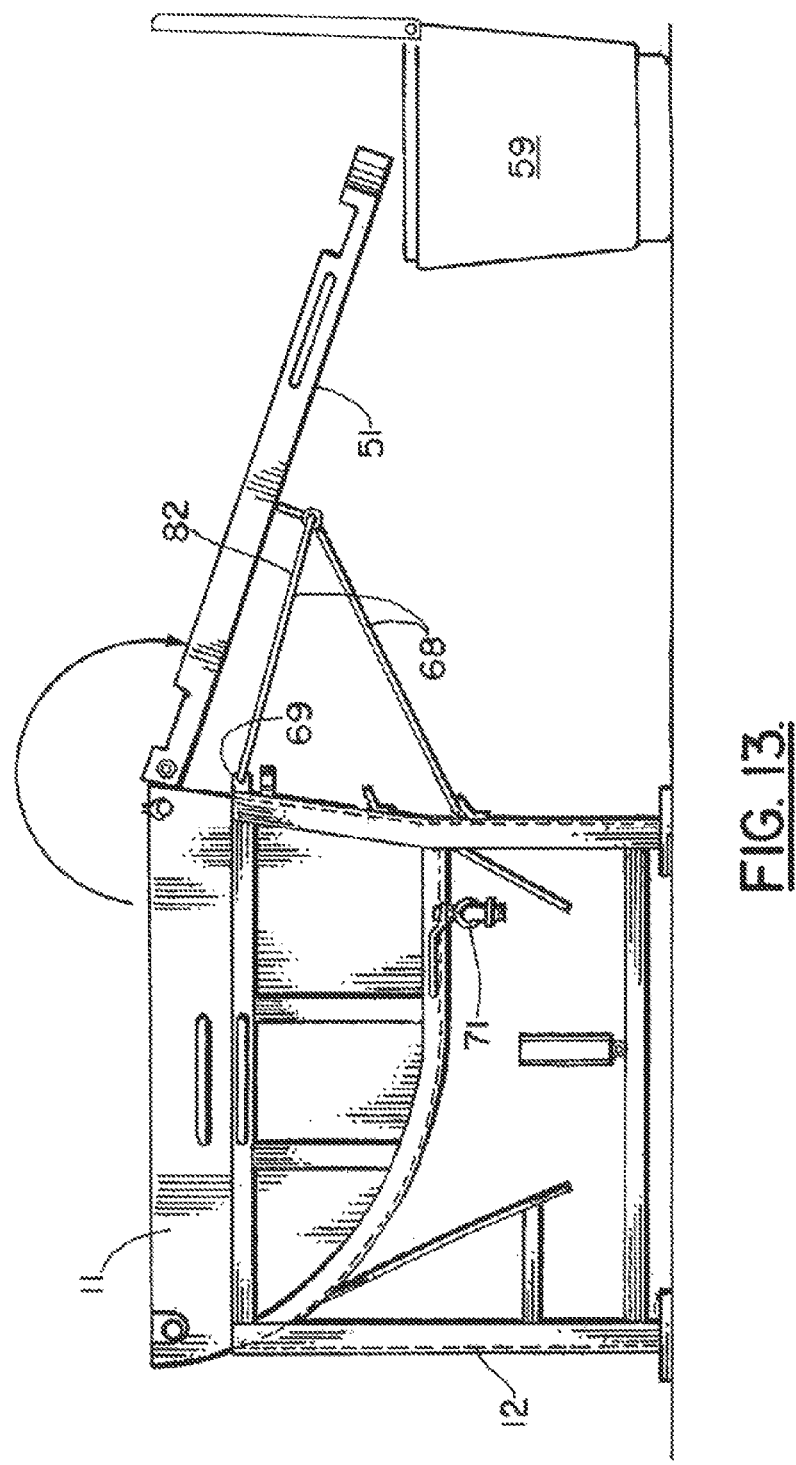
FIG. 13 is a side view of the alternate embodiment of the apparatus of the present invention.

When the handles 46, 47 (see FIG. 3) are lifted upwardly, basket 40 rotates as illustrated by arrow 65 in FIGS. 6-7 from a cooking position (FIG. 5) to a discharge position (FIG. 8). When this occurs, any seafood items 60 that are being cooked are canned, biased or pushed in the direction of arrow 66 so that they very quickly occupy the deepest part 39 of basket 40 which is that portion in between vertical reference line 33 and basket rear wall 44. This arrangement concentrates the food items to be lifted very close to pivotal connection or hinge 41. In this fashion, the apparatus of the present invention can cook very large volumes or pounds of seafood such as for example, 100-200 pounds of seafood items and yet still easily discharge those food items 60 from basket 40 to lid 51.

Lid 51 attaches at hinges 52 in a pivotal fashion to pot 11. Lid 51 can provide a pair of handles 53, 54 for lifting the lid 51 from a cooking position wherein it covers the open top of pot 11 to a discharge position (FIG. 8) wherein the lid 51 rotates about 180 degrees or preferably more than 180 degrees. The lid 51 can be provided with side walls 55, 56 for preventing escape of food items 60 that are discharged from basket 40 to lid 51 when lid 51 is in the open or food discharge position. In FIG. 8, food items 60 travel upon lid 51 to container 59 as indicated by arrow 67. Food items 60 can slide upon lid 51 via gravity or be pushed using a spoon, paddle or other utensil. Stops or lid supports 57, 58 can be provided for limiting the degree of opening of lid 51 relative to pot 11. After cooking is complete, fluid contained within pot 11 can be drained via fluid outlet fitting 61 and valve 62. Valve 62 can be provided with a valve handle 63 for opening and closing the valve.

FIGS. 9-13 show an alternate arrangement for supporting the lid 51 in an open position such as when food items are to be discharged from the pot 11 after cooking is complete. In this alternate arrangement of FIGS. 9-13, the lid 51 can be selectively supported in one of multiple positions. The pot 11 and basket 40 can be similarly configured to the frame 12, pot 11 and basket 40 shown in FIGS. 1-8. For example, the lid 51 can be supported in a generally horizontal open position (FIG. 12) or in an inclined open position that forms an obtuse angle with the plane that is defined by upper edges 24-27 of the pot 11 (see FIG. 13). In the horizontal open position, food items discharged from pot 11 to the opened lid 51 remain on the lid 51 for further transfer to plates, trays, or other vessels. In the inclined position of FIG. 13, the food items discharged to the lid 51 slide downwardly into a large receptacle such as a bucket, basket, ice chest or the like 59 as the lid 51 functions as a discharge ramp.

FIGS. 9-13 show a lid support 68 that enables support of lid 51 in one of multiple selected positions for enabling receipt by lid 51 of food items 60 that are discharged from pot 11 and basket 40. Lid support 68 includes an upper frame 82 that is hingedly attached to the frame or base 12 using hinges 69 (see FIG. 11). Each hinge 69 supports a shaft 78 portion of the lid support 68. The shaft 78 can be supported by two, three or more hinges 69. Shaft 78 connects at its end portions to arms 79. Each arm 79 is connected to horizontal section 77. Horizontal section 77 can be parallel to and spaced from shaft 78. There can be a bend 80 at the joint between each arm 79 and horizontal section 77. When lid 51 is opened, it rests upon horizontal section 77.

Diagonal support 70 holds upper frame 82 in the selected position. Diagonal support 70 includes support arms 76, horizontal section 75 and pivots or bushings or hinges 72. These pivots, bushings or hinges 72 define a pivotal connection at horizontal section 77 between upper frame 82 and diagonal support 70. Horizontal section 75 can be selectively supported in an upper position by upper receptacles or hooks 73 (see FIGS. 11, 12) or in a lower position by lower receptacles or hooks 74 (see FIG. 13). In the upper position, the upper frame is generally horizontally positioned to support the lid 51 in an upper, generally horizontal position. In this upper generally horizontal position, the lid 51 retains food items that are discharged to it from pot 11 and basket 40. In the lower position, lid 51 is inclined so that food items discharged upon lid 51 from pot 11 and basket 40 slide upon lid 51 into a receptacle (e.g., ice chest 59) placed next to lid 51. It should be understood that other positions of the upper frame 82 could be provided by providing other hooks on frame 12 in addition to the upper and lower receptacles or hooks 73, 74. Clasp 81 is also included on frame 12.

A steamer plate can be bolted to basket 40 for enabling food items to be steamed. In such a case, water is placed in pot 11 but filled to a level that is below the steamer plate. The steamer plate can be bolted so that it can be removed when not needed, such as when food items are to be boiled in pot 11. During steaming, the steamer plate would be generally horizontally supported in basket 40 about one quarter to one half the distance between the top and bottom of basket 40. As with the preferred embodiment, pot 11 can be drained using valved drain 71.

PARTS LIST

The following is a list of parts and materials suitable for use in the present invention:

| Parts Number | Description |
| --- | --- |
| 10 | outdoor food boiler |
| 11 | pot |
| 12 | base/frame |
| 13 | burner element |
| 14 | fuel supply line |
| 15 | influent fitting |
| 16 | pot interior |
| 17 | end wall |

-continued

| Parts Number | Description |
| --- | --- |
| 18 | end wall |
| 19 | rear wall |
| 20 | bottom wall |
| 21 | seam/joint |
| 22 | curved joint/seam |
| 23 | curved joint/seam |
| 24 | upper edge |
| 25 | upper edge |
| 26 | upper edge |
| 27 | upper edge |
| 28 | curvature |
| 29 | reference point |
| 30 | reference point |
| 31 | horizontal plane |
| 32 | first ramp section |
| 33 | vertical line |
| 34 | dimension |
| 35 | dimension |
| 36 | handle |
| 37 | handle |
| 38 | second ramp section |
| 39 | deepest part |
| 40 | basket |
| 41 | hinge(s)/pivotal connection(s) |
| 42 | end wall |
| 43 | end wall |
| 44 | rear wall |
| 45 | bottom wall |
| 46 | handle |
| 47 | handle |
| 48 | recess |
| 49 | recess |
| 50 | perforation/opening |
| 51 | lid |
| 52 | hinge |
| 53 | handle |
| 54 | handle |
| 55 | side wall |
| 56 | side wall |
| 57 | stop/lid support |
| 58 | stop/lid support |
| 59 | container/receptacle/ice chest |
| 60 | seafood items/food items |
| 61 | fluid outlet fitting |
| 62 | valve |
| 63 | valve handle |
| 64 | inclined ramp section |
| 65 | arrow |
| 66 | arrow |
| 67 | arrow |
| 68 | lid support |
| 69 | hinge(s) |
| 70 | diagonal support |
| 71 | valved drain |
| 72 | hinge/bushing/pivot |
| 73 | upper receptacle/hook |
| 74 | lower receptacle/hook |
| 75 | horizontal section |
| 76 | support arm |
| 77 | horizontal section |
| 78 | shaft |
| 79 | arm |
| 80 | bend |
| 81 | clasp |
| 82 | upper frame |
| 83 | lesser inclined second ramp section |
| 84 | legs or feet |
| 85 | flame or flames |
| 86 | burner jet |
| 87 | open ended pipe or tube |
| 88 | fuel supply hose |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A seafood boiler apparatus, comprising:
   a) a base;
   b) a pot that rests upon the base, the pot having a bottom wall, side walls, an open top, a pot shallow end portion and a pot deep end portion;
   c) a basket that is sized and shaped to occupy the pot interior, the basket pivotally connecting to the pot at a hinge;
   d) a pot lid that removably fits and covers the open top;
   e) the pot depth gradually decreasing from a maximum depth vertically below the pivot to a minimum depth at a position spaced farthest away from the hinge; and
   f) wherein the pot bottom wall is elliptically curved.

2. The seafood boiler apparatus of claim 1 wherein the lid is hingedly attached to the pot.

3. The seafood boiler apparatus of claim 1 wherein the lid is rotatably attached to the pot.

4. The seafood boiler apparatus of claim 1 wherein the pot has a hinge mounted above the pot deep end portion, the lid being rotatably attached to the pot at the hinge.

5. A seafood boiler apparatus, comprising:
   a) a base;
   b) a pot that rests upon the base, the pot having a bottom wall, side walls, an open top, a pot shallow end portion and a pot deep end portion;
   c) a basket that is sized and shaped to occupy the pot interior, the basket pivotally connecting to the pot at a hinge;
   d) a pot lid that removably fits and covers the open top; and
   e) the pot depth gradually decreasing from a maximum depth vertically below the pivot to a minimum depth at a position spaced farthest away from the hinge, wherein at least one side wall has a partial elliptical shape.

6. The seafood boiler apparatus of claim 5 wherein at least two of the side walls has a partial elliptical shape.

7. A seafood boiler apparatus, comprising:
   a) a base;
   b) a pot that rests upon the base, the pot having a bottom wall, side walls, an open top, a pot shallow end portion and a pot deep end portion;
   c) a basket that is sized and shaped to occupy the pot interior, the basket pivotally connecting to the pot at a hinge;
   d) a pot lid that removably fits and covers the open top; and
   e) the pot depth gradually decreasing from a maximum depth vertically below the pivot to a minimum depth at a position spaced farthest away from the hinge, wherein the pot bottom wall is curved.

8. A seafood boiler apparatus, comprising:
   a) a base;
   b) a pot that rests upon the base, the pot having a bottom wall, side walls, an open top, a pot shallow end portion and a pot deep end portion;
   c) a basket that is sized and shaped to occupy the pot interior, the basket pivotally connecting to the pot at a hinge;
   d) a pot lid that removably fits and covers the open top; and
   e) the pot depth gradually decreasing from a maximum depth vertically below the pivot to a minimum depth at a position spaced farthest away from the hinge, wherein the lid is rotatably attached to the pot and further comprising multiple stops that enable the lid to be opened to different positions, said lid positions forming different angles with the top of the pot.

9. The seafood boiler apparatus of claim 8 wherein one of said angles is an obtuse angle.

10. The seafood boiler apparatus of claim 8 wherein one of said angles is an angle of about 180 degrees.

11. A seafood boiler apparatus comprising:
 a) a frame having a pot support;
 b) a burner element supported upon the frame;
 c) a pot that removably fits the frame, the pot having end walls, a rear wall, a front edge portion, and an inclined bottom wall that gradually changes the water depth in said pot from a deep pot depth next to said rear wall to a shallow pot depth next to said front edge portion, said bottom connecting between said rear wall and said front edge portion, said bottom wall connected to each of said end walls;
 d) a basket that is pivotally attached to the pot rear wall, the basket being correspondingly sized and shaped to said pot so that it fits within the pot interior, the basket being movable about the hinge between cooking and food discharge positions;
 e) a lid that is movably attached to the pot, said lid being movable between a cooking position wherein the lid covers the pot upper opening and food discharge position wherein the lid rotates through at least an obtuse angle from said cooking position, wherein said lid forms a tray for receiving food discharged from the basket when the basket rotates to the discharge position; and
 f) wherein the bottom wall is curved.

12. The seafood boiler apparatus of claim 11 wherein the pot bottom wall is elliptically curved.

13. The seafood boiler apparatus of claim 11 wherein the lid is pivotally attached to the pot.

14. The seafood boiler apparatus of claim 11 wherein the lid is rotatably attached to the pot.

15. The seafood boiler apparatus of claim 11 wherein the pot has a pot deep end portion, and further comprising a hinge mounted above the pot deep end portion, the lid being rotatably attached to the pot at the hinge.

16. The seafood boiler apparatus of claim 11 wherein said basket has a planar rear wall that forms a connection with said basket hinge.

17. The seafood boiler apparatus of claim 11 wherein the basket pivotally connects to the pot with a pinned hinged connection that is removable so that the basket can be separated from the pot by removing the pinned hinged connections.

18. A seafood boiler apparatus comprising:
 a) a frame having a pot support;
 b) a burner element supported upon the frame;
 c) a pot that removably fits the frame, the pot having end walls, a rear wall, a front edge portion, and an inclined bottom wall that gradually changes the water depth in said pot from a deep pot depth next to said rear wall to a shallow pot depth next to said front edge portion, said bottom connecting between said rear wall and said front edge portion, said bottom wall connected to each of said end walls;
 d) a basket that is pivotally attached to the pot rear wall, the basket being correspondingly sized and shaped to said pot so that it fits within the pot interior, the basket being movable about the hinge between cooking and food discharge positions;
 e) a lid that is movably attached to the pot, said lid being movable between a cooking position wherein the lid covers the pot upper opening and food discharge position wherein the lid rotates through at least an obtuse angle from said cooking position, wherein said lid forms a tray for receiving food discharged from the basket when the basket rotates to the discharge position; and
 f) wherein each of the two end walls has a partial elliptical shape.

19. A seafood boiler apparatus comprising:
 a) a frame having a pot support;
 b) a burner element supported upon the frame;
 c) a pot that removably fits the frame, the pot having end walls, a rear wall, a front edge portion, and an inclined bottom wall that gradually changes the water depth in said pot from a deep pot depth next to said rear wall to a shallow pot depth next to said front edge portion, said bottom connecting between said rear wall and said front edge portion, said bottom wall connected to each of said end walls;
 d) a basket that is pivotally attached to the pot rear wall, the basket being correspondingly sized and shaped to said pot so that it fits within the pot interior, the basket being movable about the hinge between cooking and food discharge positions;
 e) a lid that is movably attached to the pot, said lid being movable between a cooking position wherein the lid covers the pot upper opening and food discharge position wherein the lid rotates through at least an obtuse angle from said cooking position, wherein said lid forms a tray for receiving food discharged from the basket when the basket rotates to the discharge position; and
 f) wherein the lid is rotatably attached to the pot and further comprising multiple stops that enable the lid to be opened to different positions, said lid positions forming different angles with the top of the pot.

20. The seafood boiler apparatus of claim 19 wherein one of said angles is an obtuse angle.

21. The seafood boiler apparatus of claim 19 wherein one of said angles is an angle of about 180 degrees.

* * * * *